United States Patent [19]
Aerts et al.

[11] Patent Number: 5,240,993
[45] Date of Patent: Aug. 31, 1993

[54] PROCESS FOR THE PREPARATION OF RUBBER-REINFORCED MONOVINYLIDENE AROMATIC POLYMERS

[75] Inventors: Ludo M. Aerts, Lokeren; Claude T. E. van Nuffel, Oostakker, both of Belgium; Narasaiah Alle, Baton Rouge, La.

[73] Assignee: The Dow Chemical Company, Midland, Mich.

[21] Appl. No.: 563,760

[22] Filed: Aug. 7, 1990

[30] Foreign Application Priority Data

Aug. 2, 1989 [GB] United Kingdom ............... 8918157

[51] Int. Cl.$^5$ ............... C08F 255/06; C08F 279/02; C08F 287/00; B01J 8/00
[52] U.S. Cl. .................................. 525/52; 525/53; 525/71; 525/310; 525/314; 525/316; 422/197
[58] Field of Search ............... 525/53, 310, 314, 316, 525/52, 71

[56] References Cited

U.S. PATENT DOCUMENTS

| | | |
|---|---|---|
| 2,727,884 | 12/1955 | McDonald et al. |
| 3,658,946 | 4/1972 | Bronstert et al. |
| 3,663,656 | 5/1972 | Ford et al. |
| 3,676,527 | 7/1972 | Babcock, Jr. et al. |
| 3,903,200 | 9/1975 | Cincers et al. |
| 3,903,202 | 9/1975 | Carter et al. |
| 3,928,494 | 12/1975 | Aliberti . |
| 4,146,589 | 3/1979 | Dupre . |
| 4,153,645 | 5/1979 | Lanza . |
| 4,214,056 | 7/1980 | Lavengood . |
| 4,254,236 | 3/1981 | Burk .................. 525/316 |
| 4,277,574 | 7/1981 | Jastrzebski . |
| 4,334,039 | 6/1982 | Dupre . |
| 4,640,959 | 2/1987 | Alle . |

FOREIGN PATENT DOCUMENTS

| | | |
|---|---|---|
| 0832523 | 1/1970 | Canada . |
| 0015752 | 9/1980 | European Pat. Off. . |
| 0048389 | 3/1982 | European Pat. Off. . |
| 0096447 | 12/1983 | European Pat. Off. . |
| 0158258 | 10/1985 | European Pat. Off. . |

OTHER PUBLICATIONS

H. A. Schwartz, The Metallographic Determination of the Size Distribution of Temper Carbon Nodules, Metals & Alloys, Jun. 1934, pp. 139–140, vol. 5.

F. Lenz, A. F. Wiss Mikroskopie, 1956, pp. 50–60, vol. 63.

"Perry's Chemical Engineers' Handbook", 6th ed. New York, McGraw-Hill, 1984, pp. 4-24–4-35.

*Primary Examiner*—Vasu S. Jagannathan

[57] ABSTRACT

Disclosed is a process for the production of a rubber-reinforced polymer composition having a bimodal particle size distribution using parallel, substantially plug flow reactors to separately polymerize the same or different solutions of a rubber in a monovinylidene aromatic monomer and optionally at least one other monomer. After separate partial polymerizations, first and second prepolymer compositions are produced containing rubber particles having average particle sizes of from 0.05 to 1.5 micrometer and from 0.7 to 10 micrometer, respectively, with the average rubber particle size of the second prepolymer composition being at least 1.3 times the average rubber particle size of the first prepolymer composition.

18 Claims, 1 Drawing Sheet

PROCESS FOR THE PREPARATION OF RUBBER-REINFORCED MONOVINYLIDENE AROMATIC POLYMERS

BACKGROUND OF THE INVENTION

This invention relates to a process for producing rubber-reinforced polymer compositions, and in particular to producing compositions of the type referred to as "high impact polystyrene" (HIPS) and "acrylontrile-butadiene styrene" (ABS). More particularly, the invention relates to the production of rubber-reinforced polymer compositions, in which the rubber-reinforcing particles have a bimodal particle size distribution.

Rubber-reinforced polymer compositions of the HIPS and ABS types are widely used in many applications because of their ease of molding, good gloss, and generally good mechanical properties.

It has been known for some time that improvements in mechanical properties of rubber-reinforced polymers can be achieved by providing a so-called "bimodal" distribution of rubber-reinforcing particles, i.e. one in which the rubber-reinforcing particles show two distinct peaks in their size distribution. A number of proposals have been made for ways for achieving such a bimodal particle distribution For example, U.S. Pat. No. 4,153,645 discloses a method for the preparation of a HIPS-type polymer, in which two polymer compositions are prepared, having different average particle sizes, and the two polymer compositions are then mixed by a mechanical blending process.

An alternative approach to producing HIPS and ABS polymers with a bimodal rubber distribution has been to introduce a feed stream of monomer and rubber at two different points in the polymerization system. This results in a polymer product which generally has a fairly broad spread of rubber particle sizes. Examples of this are described in EP 0 015 752, U.S. Pat. No. 4,334,039 and EP 0 096 447. A disadvantage of such methods is that the mechanical properties of the resulting product can be somewhat poor and difficult to control.

Yet a further approach is disclosed in U.S. Pat. No. 4,146,589 and EP 0 048 389. In this method, two prepolymer compositions are prepared, containing rubber particles with different particle sizes. The prepolymer compositions are then mixed and further polymerized to provide a polymer having a bimodal particle size distribution.

The method of preparation of the prepolymer compositions is described in outline in U.S. Pat. No. 4,146,589, and in detail in U.S. Pat. No. 3,903,202, referred to at column 3 line 57 of U.S. Pat. No. 4,146,589. The method consists essentially of the use of a continuously stirred tank reactor ("CSTR") for both the prepolymer compositions. The monomer is introduced continuously into such a CSTR, essentially a stirred tank, and a product stream is continuously removed. The result again is rather poor control over (a) rubber particle sizes, (b) degree of rubber grafting and (c) polymer molecular weight in the resulting product.

The polymers resulting from these polymerization methods, although superior to monomodal compositions, and to some compositions produced by mechanical blending and having a bimodal distribution, leave something to be desired in terms of mechanical properties, particularly impact resistance and it is an object of the present invention to provide a process for preparation of compositions with further improved physical property combinations.

SUMMARY

We have discovered that substantial improvements in the production process and in the mechanical properties, particularly impact resistance, of bimodal rubber reinforced compositions can be achieved, by separately producing prepolymer compositions utilizing substantially plug-flow reactors and combining and further polymerizing the combined prepolymer streams to produce the product.

In accordance with the present invention, there is provided a continuous process for the production of a rubber-reinforced polymer composition having a bimodal particle size distribution, which process comprises, continuously introducing into a first substantially plug-flow reactor a first solution of a rubber in a monovinylidene aromatic monomer and optionally at least one other comonomer, continuously introducing into a second substantially plug-flow reactor a second solution of a rubber in a monovinylidene aromatic monomer and optionally at least one other comonomer, which second solution may be the same as or different from the said first solution, continuously polymerizing the first solution in the said first reactor to a conversion of from about 10 to 50 percent based on the total monomers present to produce a first prepolymer composition containing rubber particles having an average particle size of from about 0.05 to about 1.5 micrometer, continuously polymerizing the second solution in the said second reactor to a conversion of from about 10 to about 50 percent based on the total monomers present, to produce a second prepolymer composition, containing rubber particles having an average particle size of from about 0.7 to about 10 micrometer, the average rubber particle size of the second prepolymer composition being at least about 1.3 times the average rubber particle size of the first prepolymer composition, continuously withdrawing the first and second prepolymer compositions from the respective first and second reactors, producing a third prepolymer composition by continuously mixing the first and second prepolymer compositions in a proportion such that the rubber particles derived from the first prepolymer constitute from about 50 to about 95 percent by weight of the rubber content of the third prepolymer, and the rubber particles derived from the second prepolymer constitute from about 5 to about 50 percent by weight of the rubber content of the third prepolymer, the said proportions being based on the rubber or rubber equivalent, continuously further polymerizing the third prepolymer composition, and separating the resulting polymer product from any unreacted starting materials to produce a rubber-reinforced polymer composition having a bimodal size distribution.

DETAILED DESCRIPTION

Figure 1:
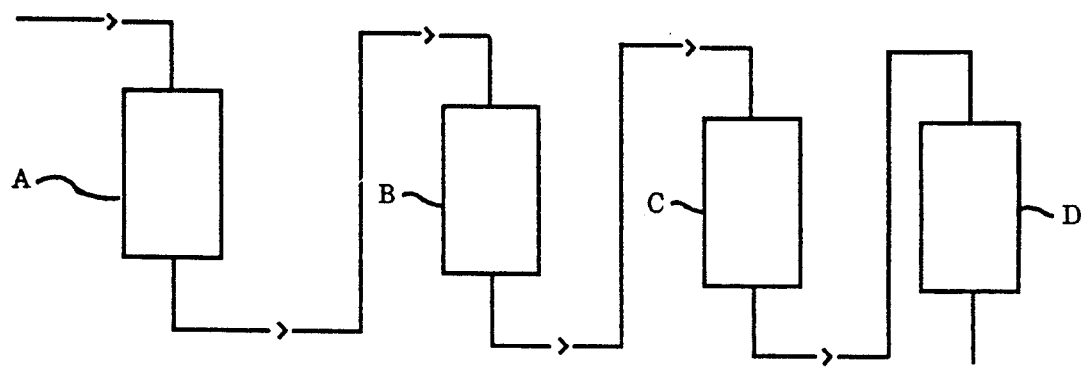
FIG. 1 of the drawings generally represents schematically a conventional process and apparatus for the production of HIPS or ABS.

The term "rubber" or "rubber equivalent" as used herein is intended to mean, for a rubber homopolymer (such as polybutadiene), simply the amount of rubber, and for a block copolymer, the amount of the copolymer made up from monomer(s) which, when homopolymerized form a rubbery polymer, e.g. for a butadiene-styrene block copolymer, the amount of the butadiene component of the block copolymer.

The process of the present invention is characterized by the utilization in the preparation of the prepolymer compositions of substantially plug-flow reactors. It is generally preferred to utilize a linear flow stirred tower reactor. Such reactors are well known. See, for example U.S. Pat. No. 2,727,884. We have determined that their utilization in a process of the kind described can provide very substantial improvements in the production process and in the mechanical properties of the product, and in particular in product impact resistance.

The rubber-reinforced polymers of the present invention are derived from one or more monovinylidene aromatic compounds. Representative monovinylidene aromatic compounds include styrene, alkyl substituted styrenes such as alpha-alkyl-styrene (e.g., alpha-methyl-styrene and alpha-ethyl-styrene) and ring substituted styrenes (e.g., vinyltoluene, particularly, p-vinyl-toluene, o-ethyl-styrene and 2,4-dimethyl-styrene): ring substituted halo-styrenes such as chlorostyrene, 2,4-dichloro-styrene and the like; styrene substituted with both a halo and alkyl group, such as 2-chloro-4-methylstyrene, vinyl anthracene; and mixtures thereof. In general, the polymer matrix preferably utilizes styrene and/or alpha-methyl-styrene as the monovinylidene aromatic monomer, with styrene being the most preferred monovinylidene aromatic compound.

The monomer mixture may also comprise one or more additional comonomers, preferably in an amount of up to 40 percent by weight of the polymerizable monomer mixture. Suitable comonomers are unsaturated nitriles, for example acrylonitrile; alkyl acrylates and alkyl methacrylates, for example methyl methacrylate or n-butylacrylate; ethylenically unsaturated carboxylic acid monomers; and ethylenically unsaturated carboxylic acid derivative monomers including anhydrides and imides such as maleic anhydride and N-phenyl maleimide.

The rubber employed in preparing the rubber modified polymer of the present invention is generally a homopolymer or copolymer of an alkadiene or a copolymer of ethylene, propylene and, optionally, a non-conjugated diene. Advantageously the rubber is a homopolymer of a 1,3-conjugated diene such as butadiene, isoprene, piperylene, chloroprene and the like or a copolymer of said conjugated dienes with one or more of the monovinylidene aromatic compounds such as styrene; alpha, beta-ethylenically unsaturated nitriles such as acrylonitrile; alpha-olefins such as ethylene or propylene; and the like. The rubber utilized to produce the larger size rubber particles is preferably a polybutadiene. The rubber utilized to produce the smaller size particles may be a polybutadiene or a poly(butadiene-styrene) block copolymer.

Although the rubber may contain a small amount of a crosslinking agent, excessive crosslinking can result in loss of the rubbery characteristics and/or render the rubber insoluble in the monomer.

The rubbery polymers preferably employed in the preparation of both the smaller and larger size, disperse rubber particles exhibit a second order transition temperature not higher than about 0° C. and preferably not higher than about −20° C.

Preferred rubber polymers are homopolymers of 1,3-butadiene and block or random copolymers of at least about 30, more preferably from about 50 to about 90, weight percent 1,3-butadiene and up to about 70, more preferably from about 5 to about 50, weight percent of a monovinylidene aromatic compound, preferably styrene The rubber is advantageously employed in amounts such that the rubber-reinforced polymer product contains from about 2 to about 20 percent, preferably from about 3 to about 17 percent, more preferably about 3 to about 15 weight rubber (expressed as rubber or rubber equivalent).

In one embodiment of the invention, the process is used for the preparation of a HIPS-type composition, i.e. one in which the optional comonomers referred to above are not employed, and the resulting composition consists essentially of a matrix of polymerized monovinylidene monomer, with dispersed particles of rubber.

Alternatively, the process may be utilized in the preparation of acrylonitrile-butadiene-styrene type compositions (so-called "ABS-type" compositions), in which at least an alkenyl nitrile, generally acrylonitrile, is used as a comonomer.

The first and second solutions may preferably also comprise an alkenyl acrylate, or an alkenyl methacrylate, for example n-butyl acrylate or methylmethacrylate. It is generally found that according to the present invention, compared to prior art processes for producing such compositions, equivalent mechanical properties can be obtained using a lower rubber content or superior properties can be obtained at equivalent rubber contents and with a simplified and economical production process.

The first and/or second solutions may contain one or more flow promotors, mold release agents, antioxidants, catalysts, lubricants, plasticizers or chain transfer agents, as is conventional in this field of art.

The first solution is polymerized until a point beyond that at which phase inversion occurs, the rubber particles at this point generally having an average particle size of from about about 0.05 to about 1.5 micrometer. For HIPS-type compositions according to the present invention the rubber particle size in this first solution is preferably in the range of about 0.1 to about 1 micrometer and more preferably about 0.2 to about 0.7 micrometer. For ABS-type compositions according to the present invention the rubber particle size in this first solution is preferably in the range of about 0.2 to about 1 micrometer, more preferably about 0.4 to about 1 micrometer and most preferably about 0.5 to about 0.8 micrometer.

The particle size of the rubber particles formed in the second prepolymer composition is generally in the range of from about 0.7 to about 10 micrometer. For HIPS-type compositions according to the present invention the rubber particle size in this second solution is preferably in the range of about 1 to about 6 micrometer and more preferably about 1.5 to about 5 micrometer. For ABS-type compositions according to the present invention the rubber particle size in this second solution is preferably in the range of about 0.8 to about 10 micrometer and more preferably about 1 to about 5 micrometer.

As used herein, the said particle size is the diameter of the rubber particles as measured in the resultant product, including all occlusions of matrix polymer within rubber particles which are generally present in the disperse rubber particles of a rubber-reinforced polymer prepared using mass polymerization techniques. Rubber particle sizes and distributions may be measured using conventional techniques such as (for larger particles) using a Coulter Counter (Coulter Counter is a Trade Mark) or, particularly for smaller particles, transmission electron microscopy.

The invention includes within its scope apparatus for the production of a rubber-reinforced polymer composition having a bimodal particle size distribution, which apparatus comprises:

first and second substantially plug-flow reactors for the polymerization of solutions of a rubber in a monovinylidene aromatic monomer, and optionally at least one other comonomer, the reactors preferably being linear flow stirred tower reactors, means for introducing a first solution of a rubber in a monovinylidene aromatic monomer, and optionally at least one other comonomer, continuously, into the first reactor, means for introducing a second solution of a rubber in a monovinylidene aromatic monomer, and optionally at least one other comonomer, continuously into the second reactor means for combining the output from the said first and second reactors, and for passing the combined output to at least a third reactor for further polymerization, the said third reactor preferably also being of the plug-flow stirred tower type, and means for separating the polymer produced from the unreacted monomers to produce a rubber-reinforced polymer composition having a bimodal particle size distribution. The apparatus may preferably include at least two further reactors for polymerization (i.e third and fourth linear flow stirred tower reactor), in which the said output stream is polymerized, prior to the separation step.

The polymerization to produce the prepolymers is conducted in one or more substantially linear stratified flow or so-called plug-flow type reactors, for example as described in U.S. Pat. No. 2,727,884.

In general, in mass polymerization processes using a plug-flow type reactor to polymerize a monomer feed stream containing a rubbery polymer dissolved therein "phase inversion" is observed. Upon initial formation of polymer, it forms a discontinuous phase comprising polymer dissolved in monomer dispersed throughout a continuous phase of the solution of rubber and monomer. Eventually, sufficient amounts of the monomer are polymerized and the discontinuous phase becomes larger in volume and becomes the continuous phase with the rubber forming a discontinuous phase dispersed therethrough. This phenomenon, referred to as "phase inversion", is, therefore, the conversion of the polymer from a discontinuous phase dispersed in the continuous phase of the rubber/monomer solution, through the point where there is no distinct continuous or discontinuous phase in the polymerization mixture, to a continuous polymer phase having the rubber dispersed therethrough.

In the method in accordance with the invention, separate rubber reinforced prepolymer compositions are prepared, utilizing such a mass-polymerization technique producing the desired average particle sizes and particle size distributions. The two prepolymer compositions are then blended together in a ratio such as to provide the desired fraction of the smaller and larger particles in the final product and polymerization of the matrix prepolymers is continued so as to produce the desired final polymer matrix. In this method, polymerization of the two separate components is carried out at least until after the point of phase inversion has been reached and the particle size is stabilized. After this point it is believed that the size of the rubber particles formed does not change appreciably.

The techniques of mass-polymerization, and the conditions needed for producing the desired average particle sizes are well known to one skilled in the art, and will not be described in detail.

A suitable initiator may be employed in the preparation of the rubber-reinforced polymer. Representative of such initiators include the peroxide initiators such as the peresters, e.g., tertiary butyl peroxybenzoate and tertiary butyl peroxyacetate, dibenzoyl peroxide, dilauroyl peroxide, 1,1-bis tertiary butyl peroxycyclohexane, 1-3-bis tertiary butyl peroxy-3,3,5-trimethyl cyclohexane, di-cumyl peroxide, and the like. Photochemical initiation techniques can be employed if desired. Preferred initiators include dibenzoyl peroxide, tertiary butyl peroxy benzoate, 1,1-bis tertiary butyl peroxy cyclohexane and tertiary butyl peroxy acetate.

Initiators may be employed in a range of concentrations dependent on a variety of factors including the specific initiator employed, the desired levels of polymer grafting and the conditions at which the mass polymerization is conducted. Specifically, in the preferred mass polymerization process for preparing rubber-reinforced polymers, from 50 to 2000, preferably from 100 to 1500, weight parts of the initiator are employed per million weight parts of monomer.

In addition to the monomer, rubber and initiator, the mass polymerization mixture preferably contains a reaction diluent. Reaction diluents advantageously employed include normally liquid organic materials which form a solution with the rubber reinforcing polymer, the polymerizable monomers and the polymer prepared therefrom. Representatives of such organic liquid diluents include aromatic and substituted aromatic hydrocarbons such as benzene, ethylbenzene, toluene, xylene or the like: substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred of such organic liquid diluents employed herein are the substituted aromatics, with ethylbenzene and xylene being most preferred. If employed, the reaction diluent is generally employed in an amount of up to about 25 weight percent, preferably from about 2 to about 25 weight percent, based on the total weight of rubber, monomer and diluent.

The polymerization mixture used in the preparation of both the smaller and larger particles may also contain other materials such as plasticizer, antioxidant (e.g., alkylated phenols such as di-tertbutyl-p-cresol or phosphites such as trisnonyl phenyl phosphite); polymerization aid, e.g., chain transfer agent, such as an alkyl mercaptan such as n-dodecyl mercaptan; or mold release agent, e.g., zinc stearate. The use of a chain transfer agent is optional, and in any event, is usually employed only in the production of the composition or prepolymer containing the larger size rubber particles (e.g. having an average particle size of at least one micrometer ter). If employed, the chain transfer agent is generally employed in an amount of from about 0.001 to about 0.5 weight percent based on the total weight of the polymerization mixture to which it is added.

The temperatures at which polymerization is most advantageously conducted are dependent on the specific components, particularly initiator, employed but will generally vary from about 60° to about 190° C.

Crosslinking of the rubber in the resulting product and removal of the unreacted monomers, as well as any reaction diluent, if employed, and other volatile materials is advantageously conducted employing conventional techniques.

In the drawings, FIG. 1 represents schematically a polymerization system for preparing a monomodal rubber-reinforced polymer composition consisting of three reactors A, B and C, providing substantially plug flow of a polymerizable composition. Each reactor has cooling and stirring capabilities. The output from the polymerization system is fed to a devolatilization apparatus, D, to remove unreacted monomers and the like.

Figure 2:
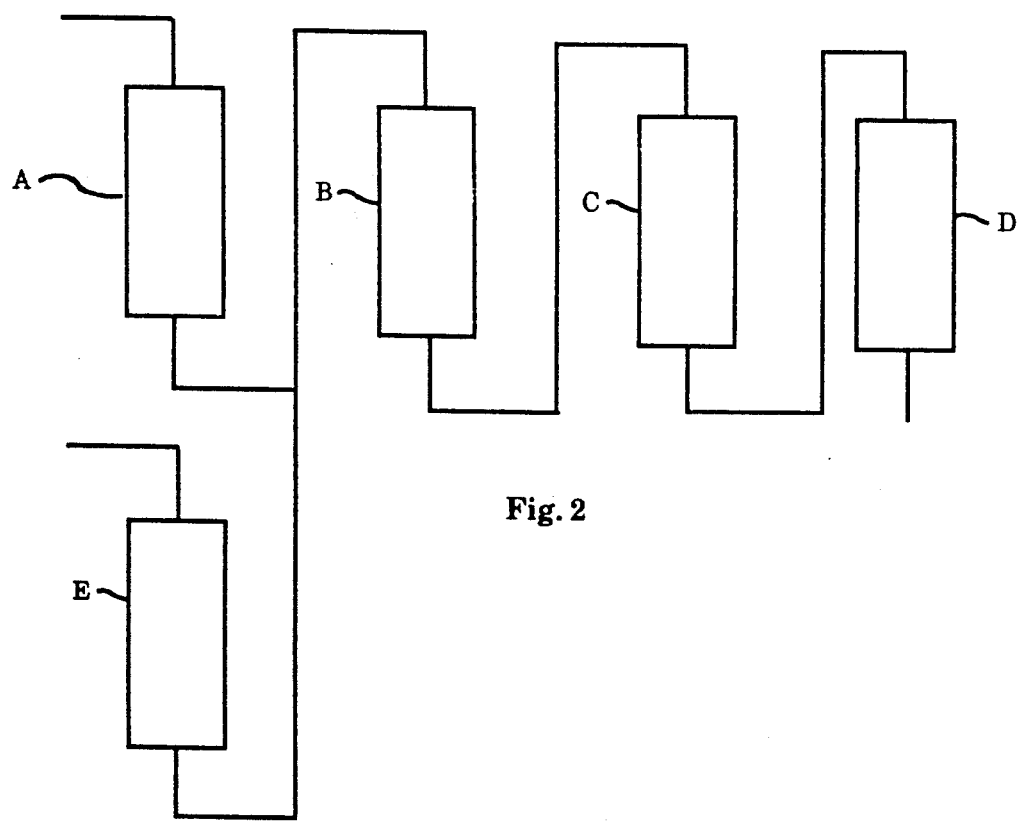
FIG. 2 generally illustrates schematically an apparatus and process in accordance with the invention.

The apparatus illustrated in FIG. 2 is generally similar to the apparatus of FIG. 1, except that an additional reactor E has been added, in parallel with reactor A. Reactor E has a smaller volume than A, but is otherwise similar.

The conditions in reactors A and E are controlled during the polymerization reaction, for example by temperature control, and control of additives in the feed, so that at the outlet from these respective reactors, phase inversion has taken place and particles of the desired particle size have been produced. The control of the particle size at phase inversion to produce a desired particle size in the prepolymer composition is within the competence of one skilled in the art. It is believed that the particle size of the rubber particles then remains essentially constant after phase inversion and during further polymerization The particle sizes referred to herein are therefore measured in the final products and attributed to the outputs of the respective reactors A and E. The output from reactor C is passed to a devolatilizer D, for treatment in a conventional manner to remove unreacted starting materials and crosslink the rubber.

SPECIFIC EMBODIMENTS OF THE INVENTION

The following examples are set forth to illustrate the present invention and should not be construed to limit its scope. In the examples, all parts and percentages are by weight and all temperatures are degrees Celsius unless otherwise indicated.

Three different rubbers were used in the following examples, designated as follows.

R1 - R1 is a styrene-butadiene di-block copolymer rubber with 40 percent by weight of polystyrene available as BUNA BL 6533 from Bayer France The solution viscosity of the blockcopolymer rubber is 40 centipoise ("cps") as a 5 percent solution in styrene.

R2 - R2 is BUNA BL 6425 a styrene-butadiene di-block copolymer rubber with 30 percent by weight of polystyrene available from Bayer France. The solution viscosity of the block copolymer rubber is 31 cps as a 5 percent solution in styrene.

R3 - R3 is a polybutadiene rubber available as BUNA HX 529C from Bayer France. It contains 54 percent trans-1,4, 35 percent, cis-1,4, has a Mooney viscosity (100 C) of 55, and its 5 percent solution viscosity in styrene is 165 cps.

As shown in Table 1 below, two rubber-reinforced styrene compositions (designated S1 and S2) having particle sizes in the range of 0.05 to 1.5 micrometers were prepared, using an apparatus generally of the form shown in FIG. 1 as follows.

S1 - A HIPS composition having a rubber particle size of 0.214 micrometer was prepared by polymerizing a solution of 11 parts of styrene butadiene (40/60) block copolymer (R1), ten parts of ethyl benzene, two parts of mineral oil, 0.08 parts of an antioxidant (Irganox 1076) and 76.92 parts of styrene. Irganox 1076 is commercially available from and is a Trademark of Ciba-Geigy. The solution was supplied to the reactor at 1000 grams per hour (g/hr).

Flow through the apparatus was substantially plug flow and polymerization was continued until the composition had a solids content of 80 wt percent with the beginning and ending polymerization temperatures as shown.

Rubber particle size (RPS) was determined by transmission electron photomicrography (TEM) (F. Lenz, A. F. Wiss Mikroskopie 63 (1956), pages 50/56) and is given in micrometers. The data were treated using a Schwartz correction, resulting in a calculation of volume average and number average rubber particle size (H. A. Schwartz, Metals and Alloys, June 1934, page 139). The rubber particle morphology was observed to be core-shell, and the rubber particle size was measured as 0.214 micrometer.

S2 - HIPS composition S2 was prepared by a similar method, using the starting materials indicated in Table 1. Composition S2 exhibited essentially core-shell morphology, with a minor amount of double core-shell, snake, and dot type particles present as well.

By a similar polymerization method, three rubber-reinforced styrene compositions with particles sizes in the range 0.7 to 10 micrometers were prepared (designated L1 to L3). The types and amounts of starting materials and reaction conditions are also illustrated in Table 1.

For comparison purposes, the Izod impact resistance, tensile strength, elongation and gloss of the individual compositions S1 and S2 and L1 to L3 were measured, and the results are shown in Table 1.

For these and subsequent experiments the following test methods were used. The Charpy impact strength (Charpy), given in kilojoules per square meter ($KJ/m^2$), was measured using the test method of DIN 53453 on injection molded samples prepared at 50° C. mold temperature and 220° to 260° C. melt temperature. Izod impact resistance (IZOD) was measured according to ASTM D256 and is given in Joules per meter (J/m). Tensile strength at yield (TSY) and elongation at yield (Elong) were measured according to ASTM D 638 and are given in megaPascals (MPa) and percent, respectively. To prepare the Izod, Charpy and tensile test specimens, the rubber-reinforced polymer was injected at an injection pressure which is experimentally determined for each sample by making moldings under increased pressures until a flash molding (excess polymer for mold) appeared and then the pressure was reduced to a pressure such that no excess material (flash molding) appeared.

Gloss was measured using a Dr. Lange reflectometer against a reference supplied with the apparatus, under two different sets of molding conditions and the results under each set of conditions given: Condition (a), melt temperature 230° C., mold temperature 50° C.; Condition (b), melt temperature 220° C., mold temperature 30° C.

The apparatus and process illustrated in FIG. 2 was then utilized to prepare rubber-reinforced polymer compositions having a bimodal particle size distribution as shown below in Table 2. For example, as shown for Experiment 1, a solution of 9.6 parts of a styrene butadiene block copolymer (R1), 10 parts of ethyl benzene, 2 parts of mineral oil, 0.08 parts of Irganox 1076 antioxidant, and 78.31 parts of styrene was continuously polymerized to a solids content of 35 weight per cent in reactor A. A solution of 6.8 parts by weight of polybutadiene (R3), 8.5 parts of ethyl benzene, 2 parts mineral oil, 0.08 parts of Irganox 1076 antioxidant, 0.02 parts of n-dodecylmercaptan chain transfer agent, 0.15 parts of 1-1-ditertiarybutylperoxycyclohexane, and 82.55 parts of styrene was fed to reactor E and continuously polymerized. The feed rates to reactors A and E were 50 g/hr and 210 g/hr respectively.

The resulting prepolymer composition produced in reactor A contains rubber particles having an average particle size of 0.2 micrometer, and the prepolymer composition produced in reactor E had an average particle size of 3.7 micrometer. The two prepolymer compositions were continuously mixed, and fed to reactor B, the ratio of the component feed rates indicated being 80/20. The amount of polybutadiene in the resulting polymer present in the large particles was therefore 80 percent by weight. The prepolymer mixture was polymerized to a solids content of 80 percent and volatile portions and solvent were removed.

The composition of the starting materials, and the polymerization conditions, are summarized in Table 2 (Experiment 1). The physical properties of the rubber-reinforced polystyrene were measured and the results are shown in Table 3.

Six further compositions were prepared in a method generally similar to that employed for Experiment 1 except that the starting compositions and polymerization conditions were as shown for Experiments 2 to 7 in Table 2 respectively. The physical properties of the resulting compositions are again given in Table 3.

Compared to the physical properties of the three compositions prepared in Experiment 5, the physical properties of three similar compositions are reproduced from U.S. Pat. No. 4,146,589. In this prior art reference two partially polymerized streams from continuously stirred tank reactors (not plug-flow reactors) were combined and further polymerized to prepare HIPS resins with bimodal particle size distributions. As can be seen, even though the amounts and types of rubber particles are generally similar, the compositions according to the present invention have surprisingly better physical properties.

Comparative bimodal HIPS compositions (identified as C-1 through C-4 in Table 3) were prepared by mechanically blending the indicated amounts of the compositions prepared above as described in Table 1 in an extruder at 230° C. The properties of these comparative products are also shown in Table 3. It will be seen from Table 3 that the compositions in accordance with the invention exhibit substantially improved mechanical and gloss properties as compared with the various mechanically blended bimodal compositions.

The following abbreviations are used in the Tables:
wt %=weight percent based on monomer(s)
BD=butadiene
TBPB=tertiary butylperoxybenzoate
DTBP=di-tertiary butylperoxide
DTBPCH=1,1-bis-ditertiary butylperoxycyclohexane
Antioxidant=Irganox 1076
Chain transfer agent=n-dodecyl mercaptan

TABLE 1

| MONOMODAL HIPS COMPOSITIONS | | | | | |
|---|---|---|---|---|---|
| | Experiment No. | | | | |
| | S1 | S2 | L1 | L2 | L3 |
| FEED COMPOSITION | | | | | |
| Rubber: type | R1 | R3 | R3 | R3 | R3 |
| amount (wt %) | 11 | 6.8 | 6.8 | 6.8 | 6.8 |
| Ethylbenzene (wt %) | 10 | 8.5 | 8.5 | 8.5 | 8.5 |
| Mineral oil (wt %) | 2 | 0.3 | 2.0 | 2.0 | 2.0 |
| Styrene (wt %) | 76.91 | 84.3 | 82.58 | 82.5 | 82.62 |
| Antioxidant (wt %) | 0.08 | 0.08 | 0.08 | 0.08 | 0.08 |
| Initiator: type | — | TBPB | — | DTBP | — |
| amount (wt %) | — | 0.02 | — | 0.02 | — |
| Chain transfer agent (wt %) | 0.01 | — | — | — | — |
| REACTION CONDITIONS | | | | | |
| Feed rate (g/hr) | 1000 | 1000 | 1000 | 1000 | 1000 |
| Temperature | | | | | |
| Reactor A (Enter) | 129 | 118 | 129 | 128 | 129 |
| Reactor C (Exit) | 175 | 175 | 180 | 175 | 180 |
| Solids level (wt %) at Reactor C Exit | 80 | 80 | 80 | 80 | 80 |
| PRODUCT PROPERTIES | | | | | |
| RPS (micrometer) | 0.214 | 1.0 | 3.5 | 6.0 | 2.5 |
| IZOD (J/m) | 29 | 70 | 106 | 69 | 96 |
| TSY (MPa) | 32.6 | 28.4 | 16.6 | 15.0 | 18.0 |
| Elong (%) | 33 | 12 | 70 | 62 | 60 |
| Gloss (%) (a) | 97 | 74 | 48 | 17 | 54 |
| Gloss (%) (b) | 86 | 47 | 27 | 21 | 33 |

TABLE 2

BIMODAL HIPS COMPOSITIONS

| | \multicolumn{7}{c}{Experiment No.} | | | | | | |
|---|---|---|---|---|---|---|---|
| | 1 | 2 | 3 | 4 | 5 | 6 | 7 |
| FEED COMPOSITION | | | | | | | |
| *Reactor A* | | | | | | | |
| Rubber type | R1 | R1 | R2 | R3 | R3 | R3 | R3 |
| amount (wt %) | 9.6 | 11.0 | 6.8 | 6.8 | 6.8 | 6.8 | 6.8 |
| Ethylbenzene (wt %) | 10.0 | 10.0 | 8.5 | 8.0 | 8.0 | 8.0 | 8.0 |
| Mineral oil (wt %) | 2.0 | 2.0 | 2.0 | 1.8 | 1.8 | 1.8 | 1.8 |
| Styrene (wt %) | 78.31 | 76.92 | 82.61 | 83.3 | 83.28 | 83.3 | 83.28 |
| Antioxidant (wt %) | 0.08 | 0.08 | 0.08 | 0.08 | 0.08 | 0.08 | 0.08 |
| Initiator type | DTBPCH | — | DTBPCH | TBPB | TBPB | TBPB | TBPB |
| amount (wt %) | 0.01 | — | 0.01 | 0.02 | 0.04 | 0.02 | 0.04 |
| *Reactor E* | | | | | | | |
| Rubber type | R3 | R3 | R3 | R3 | R3 | R3 | R3 |
| amount (wt %) | 6.8 | 6.8 | 6.8 | 6.8 | 6.8 | 6.8 | 6.8 |
| Ethylbenzene (wt %) | 8.5 | 8.5 | 8.5 | 8.0 | 8.0 | 8.0 | 8.0 |
| Mineral oil (wt %) | 2.0 | 2.0 | 2.0 | 1.8 | 1.8 | 1.8 | 1.8 |
| Styrene (wt %) | 82.555 | 82.535 | 82.59 | 83.28 | 83.3 | 83.295 | 83.26 |
| Antioxidant (wt %) | 0.08 | 0.08 | 0.08 | 0.08 | 0.08 | 0.08 | 0.08 |
| Initiator type | DTBPCH | DTBPCH | DTBPCH | — | — | — | DTBPCH |
| amount (wt %) | 0.015 | 0.015 | 0.01 | — | — | — | 0.015 |
| Chain transfer agent (wt %) | 0.02 | 0.04 | 0.02 | 0.04 | 0.02 | 0.025 | 0.04 |
| REACTION CONDITIONS | | | | | | | |
| *Reactor A* | | | | | | | |
| Feed Rate (g/hr) | 850 | 850 | 850 | 1400 | 850 | 1000 | 1000 |
| Enter (°C.) | 115 | 128 | 116 | 121 | 113 | 117 | 116 |
| Exit (°C.) | 122 | 129 | 127 | 125 | 118 | 121 | 119 |
| solids (wt %) | 35 | 35 | 34 | 32 | 36 | 36 | 38 |
| *Reactor E* | | | | | | | |
| Feed rate (g/hr) | 210 | 210 | 280 | 250 | 95-210-360 | 330 | 330 |
| Enter (°C.) | 105 | 102 | 116 | 134 | 126-132-138 | 137 | 109 |
| Exit (°C.) | 117 | 116 | 129 | 140 | 132-138-146 | 144 | 114 |
| solids (wt %) | 33 | 32 | 32 | 34 | 33-32-32 | 32 | 19 |
| *Reactor B/C* | | | | | | | |
| Enter (°C.) | 125 | 130 | 126 | 136 | 132 | 134 | 135 |
| Exit (°C.) | 175 | 175 | 175 | 175 | 175 | 175 | 175 |
| solids (wt %) | 80 | 80 | 80 | 80 | 80 | 80 | 81 |

TABLE 3

PROPERTIES BIMODAL HIPS RESINS

| | \multicolumn{4}{c}{Experiment No.} | | | |
|---|---|---|---|---|
| | 1 | 2 | 3 | 4 |
| RPS (small) (micrometer) | 0.2 | 0.2 | 1.0 | 1.0 |
| RPS (large) (micrometer) | 3.7 | 6.0 | 2.5 | 6.0 |
| Blend Components | — | — | — | — |
| Ratio small/large (wt % BD/wt % BD) | 80/20 | 80/20 | 75/25 | 85/15 |
| Total Rubber (wt %) | 8.5 | 8.5 | 8.5 | 8.5 |
| Izod (J/m) | 161 | 158 | 134 | 149 |
| TSY (MPa) | 20.7 | 20.4 | 20.1 | 21.1 |
| Elong (%) | 45 | 45 | 40 | 40 |
| Gloss (%) (a) | 91 | 89 | 69 | 69 |
| Gloss (%) (b) | 75 | 72 | 54 | 41 |

| | Experiment No. | | | |
|---|---|---|---|---|
| | 5 | \multicolumn{3}{c}{U.S. Pat. No. 4,146,589 (Expts. 16, 17 & 18)} | | |
| RPS (small) (micrometer) | 0.6 | | 0.7 | |
| RPS (large) (micrometer) | 2.5 | | 2.2 | |
| Blend Components | — | — | — | — |
| Ratio small/large (wt % BD/wt % BD) | 90/10 | 80/20 | 70/30 | 90/10 | 80/20 | 70/30 |
| Total Rubber (wt %) | 8.5 | 8.5 | 8.5 | 8* | 8* | 8* |
| Izod (J/m) | 140 | 148 | 152 | 96 | 97 | 98 |
| TSY (MPa) | 21.2 | 19.8 | 18.6 | — | — | — |
| Elong (%) | 30 | 40 | 45 | — | — | — |

TABLE 3-continued

PROPERTIES BIMODAL HIPS RESINS

| | 1 | 2 | 3 | 4 |
|---|---|---|---|---|
| Gloss (%) (a) | 84 | 78 | 74 | — | — | — |
| Gloss (%) (b) | 68 | 62 | 58 | — | — | — |

| | \multicolumn{6}{c}{Experiment No.} | | | | | |
|---|---|---|---|---|---|---|
| | 6 | 7 | C-1 | C-2 | C-3 | C-4 |
| RPS (small) (micrometer) | 1.0 | 0.6 | 0.214 | 0.214 | 1.0 | 1.0 |
| RPS (large) (micrometer) | 3.7 | 6.0 | 3.5 | 6.0 | 2.5 | 6.0 |
| Blend Components | — | — | S1/L1 | S1/L2 | S2/L3 | S2/L2 |
| Ratio small/large (wt % BD/wt % BD) | 75/25 | 75/25 | 80/20 | 80/20 | 75/25 | 85/15 |
| Total Rubber (wt %) | 8.5 | 8.5 | 8.5 | 8.5 | 8.5 | 8.5 |
| Izod (J/m) | 148 | 143 | 103 | 96 | 83 | 93 |
| TSY (MPa) | 19.6 | 21.2 | — | — | — | — |
| Elong (%) | 45 | 40 | — | — | — | — |
| Gloss (%) (a) | 65 | 73 | 88 | 80 | 65 | 63 |
| Gloss (%) (b) | 48 | 56 | 65 | 60 | 42 | 36 |

*Estimated rubber content based on 100% conversion in experiments.

Using an apparatus generally as shown in FIG. 2 three ABS-type resins were prepared, utilizing the feed compositions and polymerization conditions illustrated in Table 4. The physical properties of the resulting bimodal compositions were measured as before, and the results are shown in Table 6.

Four monomodal ABS-type resins were prepared, using a process generally as shown in FIG. 1. The composition of the reaction mixtures, and the conditions employed are shown in Table 5. The properties of the monomodal resins produced were measured and are also illustrated in Table 5.

As shown in Table 6, identified as C-5 through C-7, three bimodal ABS compositions were prepared. The indicated monomodal ABS compositions were mechanically blended in an extruder at a temperature of 230° C., in the indicated ratios and the Izod and Charpy Impact resistance values for the resulting compositions are shown.

TABLE 4
PREPARATION OF BIMODAL ABS RESINS

| | Experiment No. | | |
|---|---|---|---|
| | 8 | 9 | 10 |
| FEED COMPOSITIONS | | | |
| *Reactor A* | | | |
| Rubber type | R3 | R3 | R3 |
| amount (wt %) | 5 | 5 | 5 |
| Ethylbenzene (wt %) | 15 | 20 | 20 |
| Acrylonitrile (wt %) | 14.2 | 13 | 13 |
| Styrene (wt %) | 65.585 | 61.785 | 61.785 |
| Antioxidant | 0.2 | 0.2 | 0.2 |
| DTBPCH Initiator (wt %) | 0.015 | 0.015 | 0.015 |
| *Reactor E* | | | |
| Rubber type | R3 | R3 | R3 |
| amount (wt %) | 5 | 5 | 5 |
| Ethylbenzene (wt %) | 15 | 20 | 20 |
| Acrylonitrile (wt %) | 14.2 | 13 | 13 |
| Styrene (wt %) | 65.585 | 61.77 | 61.75 |
| Antioxidant | 0.2 | 0.2 | 0.2 |
| DTBPCH Initiator (wt %) | 0.015 | 0.015 | 0.035 |
| Chain transfer agent (wt %) | — | 0.015 | 5 |
| REACTION CONDITIONS | | | |
| *Reactor A* | | | |
| Feed rate (g/hr) | 750 | 750 | 750 |
| Enter (°C.) | 104 | 106 | 106 |
| Exit (°C.) | 115 | 114 | 114 |
| Solids (wt %) | 30 | 30 | 30 |
| *Reactor E* | | | |
| Feed Rate (g/hr) | 250 | 250 | 250 |
| Enter (°C.) | 106 | 108 | 109 |
| Exit (°C.) | 113 | 114 | 116 |
| Solids (wt %) | 32 | 27 | 29 |
| *Reactor B/C* | | | |
| Enter (°C.) | 126 | 124 | 125 |
| chain transfer agent (wt %) | — | 0.1 | 0.1 |
| Exit (°C.) | 155 | 155 | 155 |
| Solids (wt %) | 68 | 68 | 68 |

TABLE 5
MONOMODAL ABS RESINS

| | Experiment No. | | | |
|---|---|---|---|---|
| | A1 | A2 | A3 | A4 |
| FEED COMPOSITIONS | | | | |
| Rubber type | R3 | R3 | R3 | R3 |
| Rubber amount (wt %) | 5 | 5.5 | 5.5 | 5.5 |
| Ethylbenzene (wt %) | 20 | 16 | 16 | 16 |
| Acrylonitrile (wt %) | 13 | 13 | 13 | 13 |
| Styrene (wt %) | 61.98 | 65.286 | 65.264 | 65.257 |
| Antioxidant (wt %) | 0.08 | 0.08 | 0.08 | 0.08 |
| DTBPCH Initiator (wt %) | 0.02 | 0.014 | 0.016 | 0.016 |
| REACTION CONDITIONS | | | | |
| Feed rate (g/hr) | 760 | 1000 | 850 | 850 |
| *Temperatures* | | | | |
| Enter (°C.) | 102 | 102 | 108 | 108 |
| Exit (°C.) | 195 | 170 | 170 | 170 |
| Solids level (wt %) | 65 | 71 | 71 | 71 |
| Chain Transfer Agent (wt %/reactor) | 0.05/B | 0.065/B | 0.02/A 0.08/B | 0.027/A 0.08/B |
| RPS (micrometer) | 0.5 | 0.8 | 1.6 | 2.1 |
| Rubber (wt %) | 7.7 | 7.7 | 7.7 | 7.7 |

TABLE 5-continued
MONOMODAL ABS RESINS

| | Experiment No. | | | |
|---|---|---|---|---|
| | A1 | A2 | A3 | A4 |
| Charpy (kJ/m$^2$) | 1.8 | 6.9 | 6.8 | 7.0 |
| Izod (J/m) | 27 | 97 | 85 | 87 |
| TSY (MPa) | — | — | 36 | 33 |
| Elong (%) | — | — | 45 | 52 |

TABLE 6
PRODUCT PROPERTIES FOR BIMODAL ABS RESINS

| | Experiment No. | | | | | |
|---|---|---|---|---|---|---|
| | 8 | 9 | 10 | C-5 | C-6 | C-7 |
| RPS (small) (micrometer) | 0.5 | 0.5 | 0.5 | 0.5 | 0.5 | 0.5 |
| RPS (large) (micrometer) | 0.8 | 1.6 | 2.1 | 0.8 | 1.6 | 2.1 |
| Blend Components | — | — | — | A1/A2 | A1/A3 | A1/A4 |
| Ratio small/large (wt % BD/ wt % BD) | 75/25 | 75/25 | 75/25 | 75/25 | 75/25 | 75/25 |
| Total Rubber (wt %) | 7.4 | 7.4 | 7.4 | 7.4 | 7.4 | 7.4 |
| Izod (J/m) | 87 | 128 | 109 | 56 | 57 | 62 |
| Charpy (kJ/m$^2$) | 6.4 | 7.0 | 6.7 | 5.3 | 5.3 | 5.4 |

What is claimed is:

1. A continuous process for the production of a rubber-reinforced polymer composition having a bimodal particle size distribution, which process comprises, continuously introducing into a first substantially plug flow reactor a first solution of a rubber in a monovinylidene aromatic monomer and optionally at least one other comonomer, continuously introducing into a second substantially plug flow reactor a second solution of a rubber in a monovinylidene aromatic monomer and optionally at least one other comonomer, which second solution may be the same as or different from the said first solution, continuously polymerizing the first solution in the said first reactor, to a conversion of from 10 to 50% based on the total monomers present, to produce a first prepolymer composition, containing rubber particles having an average particle size of from 0.05 to 1.5 micrometer, continuously polymerizing the second solution in the said second reactor, to a conversion of from 10 to 50% based on the total monomers present, to produce a second prepolymer composition, containing rubber particles having an average particle size of from 0.7 to 10 micrometer, the average rubber particle size of the second prepolymer composition being at least 1.3 times the average rubber particle size of the first prepolymer composition, continuously withdrawing the first and second prepolymer compositions from the respective first and second reactors, producing a third prepolymer composition by continuously mixing the first and second prepolymer compositions in a proportion such that the rubber particles derived from the first prepolymer constitute from 50 to 95% by weight of the rubber content of the third prepolymer, and the rubber particles derived from the second prepolymer constitute from 5 to 50% by weight of the rubber content of the third prepolymer, the said proportions being based on the rubber or rubber equivalent, continuously further polymerizing the third prepolymer composition, and separating the resulting polymer product from any unreacted starting materials to produce a rubber-reinforced polymer composition having a bimodal size distribution, the rubber comprising a homopolymer or copolymer of an alkadiene or a copolymer of ethylene, propylene and, optionally, a non-conjugated diene.

2. The process of claim 1 wherein the monovinylidene aromatic monomer utilized in the first and/or in the second solution is styrene, alpha-methyl styrene, or a mixture thereof.

3. The process of claim 2 wherein the monomer in the first and/or second solution is styrene.

4. The process of claim 1 wherein the said first and second solutions are substantially free of the said optional comonomers, and the resulting product is a high impact polystyrene.

5. The process of claim 1 wherein the said first and second solutions each comprise acrylonitrile, methacrylonitrile, or mixtures thereof.

6. The process of claim 5 wherein at least one of the first and second solutions further comprises an alkenyl acrylate or alkenyl methacrylate.

7. The process of claim 6 wherein at least one of the said first and second solutions also comprises n-butylacrylate or methylmethacrylate.

8. The process of claim 1 wherein the rubber has a second order transition temperature of not greater than 0° C.

9. The process of claim 1 wherein the rubber is a polybutadiene-, polyisoprene, or a block copolymer of butadiene with styrene.

10. The process of claim 1 wherein the rubber content in the final product (calculated as rubber or rubber equivalent) is from about 2 to about 25 percent.

11. The process of claim 1 wherein the third prepolymer composition is further polymerized in at least one further linear flow stirred tower reactor.

12. The process of claim 1 wherein a HIPS-type product is prepared and the rubber particles in the first prepolymer composition have an average particle size of from about 0.1 to about 1 micrometer and the particle size of the rubber particles in the second prepolymer composition is from about 1 to about 6 micrometer.

13. The process of claim 12 wherein the rubber particles in the first prepolymer composition have an average particle size of from about 0.2 to about 0.7 micrometer and the average particle size of the rubber particles in the second prepolymer composition is from about 1.5 to about 5 micrometer.

14. The process of claim 1 wherein an ABS-type product is prepared and the rubber particles in the first prepolymer composition have an average particle size of from about 0.2 to about 1 micrometer and the particle size of the rubber particles in the second prepolymer composition is from about 0.8 to about 10 micrometer.

15. The process of claim 14 wherein the rubber particles of the first prepolymer composition have an average particle size of from about 0.4 to about 1 micrometer and in the second prepolymer composition the average rubber particle size is from about 1 to about 5 micrometer.

16. The process of claim 14 wherein the rubber particles of the first prepolymer composition have an average particle size of from about 0.5 to about 0.8 micrometer and in the second prepolymer composition the average rubber particle size is from about 1 to about 3 micrometer.

17. The process of claim 1 wherein the polymerization temperature is from about 60° C. to about 190° C.

18. A rubber-reinforced polymer composition having a bimodal particle size distribution, produced by the process according to claim 1.

* * * * *